(12) United States Patent
Bruening et al.

(10) Patent No.: US 7,480,671 B2
(45) Date of Patent: Jan. 20, 2009

(54) PROVISION OF DATA FOR DATA WAREHOUSING APPLICATIONS

(75) Inventors: Karsten Bruening, Wiesloch-Baiertal (DE); Georg Dopf, Schwetzingen (DE); Stefan Gauger, Heidelberg (DE); Danny Pannicke, Heidelberg (DE); Rolf Schumann, Schoenborn (DE); Peter Schwarz, Speyer (DE); Juergen Alfred Seyfried, Walldorf (DE); Andreas Reccius, Walldorf (DE)

(73) Assignee: SAP AG, Walldorf (DE)

( * ) Notice: Subject to any disclaimer, the term of this patent is extended or adjusted under 35 U.S.C. 154(b) by 523 days.

(21) Appl. No.: 10/935,404

(22) Filed: Sep. 2, 2004

(65) Prior Publication Data
US 2005/0055368 A1    Mar. 10, 2005

(30) Foreign Application Priority Data
Sep. 3, 2003    (EP) .................................. 03019592

(51) Int. Cl.
*G06F 17/30* (2006.01)
(52) U.S. Cl. .................. 707/102; 707/10; 707/201; 707/202; 709/201; 715/201
(58) Field of Classification Search .............. 707/10, 707/100, 101, 102, 6, 201, 202; 705/1, 10, 705/30, 35; 715/201; 709/201
See application file for complete search history.

(56) References Cited

U.S. PATENT DOCUMENTS

| | | | |
|---|---|---|---|
| 5,781,911 A | | 7/1998 | Young et al. |
| 6,154,766 A | * | 11/2000 | Yost et al. .................. 709/201 |
| 6,173,310 B1 | * | 1/2001 | Yost et al. .................. 709/201 |
| 6,208,990 B1 | | 3/2001 | Suresh et al. |
| 6,260,050 B1 | * | 7/2001 | Yost et al. .................. 715/202 |
| 6,269,393 B1 | * | 7/2001 | Yost et al. .................. 709/201 |
| 6,434,568 B1 | * | 8/2002 | Bowman-Amuah ..... 707/103 R |
| 6,442,748 B1 | * | 8/2002 | Bowman-Amuah ......... 717/108 |
| 6,539,396 B1 | * | 3/2003 | Bowman-Amuah ..... 707/103 R |

(Continued)

OTHER PUBLICATIONS

Niemi, Timo et al., "Multidimensional Data Model and Query Language for Informetrics", Journal of the American Society for Information Science and Technology, vol. 54, issue 10, May 20, 2003, pp. 939-951.*

(Continued)

*Primary Examiner*—Shahid A Alam
(74) *Attorney, Agent, or Firm*—Finnegan, Henderson, Farabow, Garrett & Dunner

(57) ABSTRACT

A computer network architecture for making procurement-related information that has been generated on a transaction level available to data warehousing techniques is described. The network includes a transaction processing layer with at least one accounting component with a general ledger data base for centrally storing information contained in accounted-related data sets, a data warehousing layer and an additional data sourcing layer. A duplicator receives the data sets that will be or have been stored in the general ledger data base and delivers duplicates of those data sets that fulfill a predefined criteria in a procurement context. A source data base stores the duplicated data sets on a data line level. An extractor of the data sourcing layer interfaces with the data warehousing layer and selectively moves data contained in data lines or sets of data lines from the source data base to the data warehousing layer.

22 Claims, 11 Drawing Sheets

U.S. PATENT DOCUMENTS

2002/0161778 A1    10/2002    Linstedt
2003/0130878 A1     7/2003    Kruk et al.

OTHER PUBLICATIONS

Winter, Robert, "The Current and Future Role of Data Warehousing in Corporate Application Architecture", Proceedings of the 34th Annual Hawaii International Conference on System Sciences, Jan. 3-6, 2001, pp .1-8.*

Luo, Yanchun et al., "An Integrated e-supply Chain Model for agile environmentally conscious manufacturing", IEEE/ASME Transaction on Mechatronics, Dec. 2001, vol. 6, Issue 4, pp. 377-386.*

* cited by examiner

Possible Solution

| Data set in ODS (or in persistent storage area PSA of data warehousing layer) | | | | | | | | | |
|---|---|---|---|---|---|---|---|---|---|
| account type code | Debit/credit indicator | posting key | account code | debit amount | debit amount | currency | currency type | creditor code | spend relevant flag | purch. order number |
| K | H(credit) | 31 | 160000 (reconciliation) | | -1160 | Euro | 00 (transaktion currency) | 1000 | | |
| K | H(credit) | 31 | 160000 (reconciliation) | | -2320 | Yen | 10 (Company code currency) | 1000 | | |
| K | H(credit) | 31 | 160000 (reconciliation) | | -580 | Dollar | 30 (group currency) | 1000 | | |
| S | S(debit) | 40 | 400000 (e.g. service costs) | 1000 | | Euro | 00 (transaktion currency) | 1000 | x | 00000000 01 |
| S | S(debit) | 40 | 400000 (e.g. service costs) | 2000 | | Yen | 10 (Company code currency) | 1000 | x | |
| S | S(debit) | 40 | 400000 (e.g. service costs) | 500 | | Dollar | 30 (group currency) | 1000 | x | |
| S | S(debit) | 40 | 154000 (tax) | 160 | | Euro | 00 (transaktion currency) | 1000 | x | 00000000 01 |
| S | S(debit) | 40 | 154000 (tax) | 320 | | Yen | 10 (Company code currency) | 1000 | x | |
| S | S(debit) | 40 | 154000 (tax) | 80 | | Dollar | 30 (group currency) | 1000 | x | |

FIG. 8

| Cube | | | | | | | | | | | |
|---|---|---|---|---|---|---|---|---|---|---|---|
| account type code | Debit/credit indicator | posting key | account code | Net amount in transac. currency | transac. Curr. | Net amount in Comp. code currency | Company code currency | Net amount in Group currency | Group currency | Gross amount in transac. Curr. | trans-action curr. | Gross amount in Company code currency |
| K | H | 31 | 160000 (reconciliation) | | | | | | | -1160 | Euro | -2320 |
| S | S | 40 | 400000 (e.g. service costs) | 1000 | Euro | 2000 | Yen | 500 | Dollar | | | |
| S | S | 40 | 154000 (tax) | 160 | Euro | 320 | Yen | 80 | Dollar | | | |

B

| Company code currency | Gross amount in Group curr. | Group curr. | creditor code | without PO (purchase order) reference |
|---|---|---|---|---|
| Yen | -550 | Dollar | 1000 | |
| | | | 1000 | |
| | | | 1000 | x |

| Material/Material group/ account/account group | | Period 1 | Period 2 | Period 3 | Period 4 | total result |
|---|---|---|---|---|---|---|
| office materials | Creditor 1 | 1.000,00 € | 1.000,00 € | - € | 3.500,00 € | 5.500,00 € |
| | Creditor 2 | 2.000,00 € | 1.000,00 € | 3.500,00 € | 1.000,00 € | 7.500,00 € |
| | Creditor 3 | 3.500,00 € | - € | 2.000,00 € | 2.000,00 € | 7.500,00 € |
| | Creditor 4 | 1.000,00 € | 1.000,00 € | - € | 1.000,00 € | 3.000,00 € |
| | result | | | | | 23.500,00 € |
| direct materials | Creditor 1 | 4.000,00 € | - € | 35.000,00 € | 35.000,00 € | 74.000,00 € |
| | Creditor 2 | 20.000,00 € | 4.000,00 € | 35.000,00 € | - € | 59.000,00 € |
| | Creditor 3 | - € | - € | 20.000,00 € | 20.000,00 € | 40.000,00 € |
| | Creditor 4 | 1.000,00 € | - € | - € | 4.000,00 € | 5.000,00 € |
| | Creditor 5 | - € | 20.000,00 € | 4.000,00 € | - € | 24.000,00 € |
| | Creditor 6 | 4.000,00 € | 35.000,00 € | 1.000,00 € | 4.000,00 € | 44.000,00 € |
| | result | | | | | 246.000,00 € |
| | total result | | | | | 418.000,00 € |

FIG. 10

PROVISION OF DATA FOR DATA WAREHOUSING APPLICATIONS

DESCRIPTION OF THE INVENTION

1. Field of the Invention

The invention relates to data warehousing. More specifically, the invention relates to the interaction between one or more transaction-based computer systems and a computer system that is configured to perform data warehousing tasks.

2. Background of the Invention

Modern data acquisition and processing techniques have boosted the amount of data that has to be managed and evaluated in business environments. The introduction of faster and increasingly sophisticated hardware accelerates this development. Hence, the provision of complete and consistent information becomes an increasingly complex task.

In larger enterprises, enterprise resource planning (ERP) systems like SAP R/3 are commonly used to manage business transactions in a standardized manner. Although conventional ERP systems often have to handle millions of business transactions each day, each individual business transaction usually generates only very little amounts of data. Thus, conventional ERP systems are configured as online transaction processing (OLTP) systems. OLTP systems are optimized as regards the well-defined and fast processing of very small amounts of detailed data. OLTP systems are however generally not suited for analytical tasks that involve the ad-hoc analysis of large data amounts, i.e. require online analytical processing (OLAP).

In the past, various concepts have been deployed to tackle such analytical tasks. One of the most promising concepts is OLAP-based data warehousing. Data warehousing solutions focus on gathering information from various information sources and on providing tools for analyzing the gathered data. Taking into account the advantages of data warehousing it is not surprising that this solution has been incorporated in all kinds of computer networks and in particular in computer networks that include ERP functionalities.

It is obvious that the completeness and consistency of the information delivered by data warehousing techniques is strongly dependent on the completeness and consistency of the data provided to the data warehouse by the individual data sources like ERP systems. Problems as regards the completeness of information delivered to data warehousing applications are often encountered in context with electronic procurement (EP) environments.

EP denotes the electronic generation and transfer of procurement-related data sets in a computer network that includes one or more computers on a buyer's side and one or more computers on the side of each supplier. The information generated and transferred in the computer network include data sets relating to purchase orders, goods delivery, invoicing, etc.

In spite of the advantages associated with EP systems as regards the implementation of standardized and controllable purchase mechanisms, it still happens that employees order directly from a supplier via e-mail, telephone or facsimile, skipping the installed and ready-to-operate EP mechanisms. It is clear that any purchase that has not been performed via the EP system will not be included in the data bases of the EP system and can not be considered by data warehousing mechanisms using these EP data bases as information source. Hence, tasks like analyzing the complete spend paid to suppliers (spend analysis), which is the most important basis for strategic sourcing and for contract negotiations, become inaccurate and error-prone.

In has been found that in many cases up to 30% of all purchases are not performed via the EP environment. This means that data warehousing mechanisms can not reliably be applied to analyze procurement transactions, at least if the EP system is used as single source of information.

In an attempt to make data warehousing mechanisms applicable for the analysis of procurement transactions it has been found that information about procurements performed via EP channels as well as procurements performed via other channels is in many cases already available to the data warehousing applications. The reason for this is the fact that procurement-related information is often included as "by-product" in accounting-related data that have been received in the data warehouse from accounting applications of ERP systems. Accounting-related data are generated for each procurement transaction because regardless of the procurement channel invoices and credit memos are generated and corresponding transactional data sets including accounting data will have to be posted by an ERP accounting component. However, since the accounting data comprise the procurement-related data often in an accumulated format, procurement transactions can only be analyzed very coarsely by data warehousing techniques. Moreover, the informational content of the accounting-related data as regards the analysis of procurement transactions and in particular as regards spend analysis is not sufficient.

In order to improve the analysis accuracy, a technical approach as shown in FIG. 1 might be chosen. Conventionally, accounting related data sets are extracted from an OLTP-based accounting component 210 acting as data source to an OLAP-based data warehousing layer 220 for data gathering and analysis. The data warehousing layer 220 may implement a staged data base approach including a data base 230 for storing the accounting-related data sets that have been extracted from the data source 210 and a further data base 240 that is updated by the first data base 230 and contains the accumulated accounting information comprised in the plurality of extracted data sets.

Based on the not yet accumulated information, i.e. the individual accounting-related data sets included in the data base 230, a parallel data base branch 250, 260 could be used for storing and analyzing procurement-related information contained in the accounting related data sets included in the data base 230. The content (data sets) of the data base 230 could be transferred according to a pre-defined strategy to the data base 250. The data base 250 in turn could then update the data base 260 to accumulate procurement-related information for analysis purposes.

Since the informational content included in the accounting-related data sets as regards procurement analysis is usually not sufficient for a detailed procurement analysis, the accounting-related data sets provided by the data source 210 could be enriched with procurement-related information prior to being extracted. However, such an approach would have the drawback that large amounts of data will have to be transferred between the data source 210 and the data warehousing layer 220, although only 10 to 20% of the information included in the enriched accounting-related data sets will eventually be needed for procurement (e.g. spend) analysis. But not only high network traffic would result, additionally storage and performance problems would occur in view of the fact that very often several millions of accounting-related data sets per day will have to be enriched, extracted and transferred from the data base 230 to the data base 250.

There is thus a need for a technical implementation that facilitates data warehousing for procurement-related information. More specifically, there is a need for a technical implementation which makes procurement-related information that has been generated on a transaction level available to data warehousing techniques while keeping the required network and processing resources low.

SUMMARY OF THE INVENTION

The computer network architecture of the present invention comprises a transaction processing layer as well as a data warehousing layer for gathering and accumulating information provided by the transaction processing layer. The transaction processing layer includes at least one accounting component with a general ledger data base for centrally storing information contained in accounting-related data sets that are comprised of one or more data lines. A duplicator receives the accounting-related data sets that will be or have been stored in the general ledger data base and delivers duplicates of such accounting-related data sets that fulfill a predefined criteria in a procurement context. A source data base is provided for storing the duplicated data sets on a data line level. An extractor interfacing the data warehouse layer selectively moves data contained in sets of data lines (e.g. in a duplicated data set) or in individual data lines from the source data base to the data warehousing layer.

The combination of an intelligent duplicator and a source data base selectively filled with procurement-related data of a high granularity (data line level) and arranged below the data warehouse layer allows for a reduction of network traffic. In contrast to the possible technical implementation of FIG. 1, only selected data sets need to be extracted, transferred, processed and stored in context with making procurement-related information that has been generated on a transaction level available for data warehousing. Since the additional components provided by the present invention may be arranged in the form of a separate data sourcing layer between the transaction processing layer on the one hand and the data warehousing layer on the other hand the invention can easily be utilized in combination with conventional ERP and data warehousing applications. Particularly, the invention provides an efficient mechanism for selectively transferring information available in a dispersed manner on a transaction level to a data warehousing level.

The computer network architecture of the present invention may additionally comprise an analyzer for analyzing the duplicated data sets delivered by the duplicator and for adding transfer information to the duplicated data sets. The analyzer may for example be arranged between the duplicator and the source data base or between the source data base and the extractor.

The analyzer may add the transfer information in various ways. It may for example append the transfer information in the form of additional data fields to the duplicated data sets or it may write the transfer information in existing data fields of the duplicated data sets. The transfer information may take the form of a flag setting, a receiver address or the like. The transfer information may hence control the further route of a duplicated data set. For example, the transfer information may control at least one of the extraction of data from the source data base and the transfer of extracted data in the warehousing layer. According to one variant of the invention, the transfer information is utilized as a selection criteria for selectively moving data contained in the source data base to the data warehousing layer.

The transfer information may be added in dependence of the relevancy of an individual duplicated data set in regard of a particular analysis task like spend analysis or any other procurement-related analysis that is to be performed by the data warehousing layer. The transfer information may thus be utilized as a further selection criteria besides the predefined criteria applied by the duplicator for selectively delivering duplicates of accounting-related data sets.

The data warehousing layer may have various configurations. It may for example include an information data base for accumulating information contained in the extracted data. In order to assist the OLAP tasks of the data warehousing layer, the information data base may be configured to allow for a multi-dimensional data analysis. To this end, the information data base may comprise at least one fact table and one or more associated dimension tables in a star schema.

Additionally or alternatively, the data warehousing layer may include an operational data base that is used for storing on a data line level information contained in the extracted data. The information stored in the operational data base may have a higher granularity than the information stored in the information data base. The operational data base may be used for updating the information data base. Such an updating may include an accumulation of information onto existing or newly created entries of the information data base.

The operational data base may be filled with data that has been extracted from the source data base and/or any other data base included in the transaction processing layer (e.g. the general ledger data base) or in the data sourcing layer. Also, the operational data base may be filled with data transferred from one or more additional operational data bases provided in the data warehousing layer. The transfer or extraction of data to the operational data base may be controlled by the transfer information that has previously been added to the duplicated data sets. The transfer information may for example specify the individual data sets contained in a source data base that are to be extracted into the operational data base.

Whereas the transfer information can be utilized as a rather fine selection criteria, the duplicator may apply a selection criteria that is comparatively coarser. This coarser selection criteria could be the presence or setting of a procurement-related identifier (e.g. a specific code or flag) included in the accounting-related data sets received by the duplicator.

The duplicator may have various configurations. According to a first option, the duplicator may include a combination of a duplicating component and a filter. The duplicating component may be configured to duplicate all accounting-related data sets that will be or have been stored in the general ledger data base. In this context the duplicating component need not perform any data analysis tasks and may thus be included in the transaction processing layer without any adverse affects on the efficiency of the online data processing performed there. The duplicated data sets may be output via a dedicated interface of the transaction processing layer. Any required analytical tasks may be performed by the filter that could for example be arranged in the data sourcing layer. The filter may be configured to be selectively transmissive for such duplicated data sets that fulfill the previously defined procurement-related criteria.

According to a further variant of the invention, the duplicator may completely be arranged in the transaction processing layer and may include an analyzing component as well as a duplicating component. The analyzing component may be configured to analyze all accounting-related data sets that will be or have been stored in the general ledger data base with respect to the predefined procurement-related criteria. Depending on the result of the analysis, the duplicating component may selectively duplicate such accounting-related data sets that fulfill the predefined criteria. The selectively duplicated data sets may be output via a dedicated interface of the transaction processing layer.

The duplicated data sets provided by the duplicator may be fed to a formatting component that may for example be included in the transaction processing layer or in the data sourcing layer. The formatting component may be configured to format the duplicated data sets on a data line level. Such a formatting may for example include inheriting to all data lines of an individual duplicated data set a procurement-related identifier included somewhere in this duplicated data set. The inherited procurement-related identifier may for example be constituted by a specific account code, posting key or creditor identifier. The procurement-related selection criteria applied by the duplicator may be identical with the procurement-related identifier inherited by the formatting component or may be different therefrom. The formatting component may be provided in addition to or instead of the previously mentioned analyzer that adds transfer information to the duplicated data sets.

Once the duplicated data sets have been stored in the source data base, they may be retrieved completely or partially by the extractor interfacing the data warehousing layer. The extractor may be configured to additionally perform at least one of formatting and pre-processing tasks with respect to the extracted data. If, for example, the duplicated data sets stored in the source data base include several numerical values in a single data line, the extractor may be configured to re-format an extracted data set by splitting such a data line into two or more individual data lines containing a single numerical value each. Thus, the extractor may increase the number of data lines of an extracted data set compared to the "parent" data set stored in the source data base. Such an approach facilitates the further processing of an extracted data set in the data warehousing layer.

The operational data base may be updated by the extractor in various ways. The extractor may for example apply a so-called delta updating approach according to which during an update only such data sets contained in the source data base are considered which have been stored in the source data base since the last update. To this end a time stamp may be used. Additionally or alternatively, the complete content of the source data base may be considered for an update. Such an approach is especially advantageous during an initialization step for uploading via the source data base historical data included in the general ledger data base to the data warehousing layer.

In addition to the accounting component the transaction processing layer may include at least one of an EP component and a logistics component. In such a case the data delivered from the various components included in the transaction processing layer may be combined. The data combination may be performed in the data sourcing layer, in the data warehousing layer and/or upon data extraction. According to one variant of the invention, the extractor merges data provided by at least one of the EP component and the logistics component with data extracted from the source data base.

According to a further aspect of the invention, a data sourcing layer interfacing a transaction processing layer and a data warehousing layer that gathers information provided by the transaction processing layer is provided. The data sourcing layer may comprise a filter receiving from the transaction processing layer duplicates of accounting-related data sets that will be or have been stored in a general ledger data base of the transaction layer. The data sourcing layer of the present invention further comprises a source data base for storing on a data line level the duplicated data sets that fulfill a pre-defined criteria in a procurement context, e.g. include a pre-defined procurement-related identifier. Furthermore, an extractor interfacing the data warehousing layer is provided. The extractor is configured to selectively move data contained in data lines or sets of data lines from the source data base to the data warehousing layer.

According to a still further aspect, the invention relates to a method of making procurement-related and in particular spend-relevant information that has been generated on a transaction level available to data warehousing techniques. The method comprises providing on a transaction processing level accounting-related data sets that will be or have been centrally stored and that are comprised of one or more data lines. The method further comprises generating duplicates of such accounting-related data sets that fulfill a pre-defined criteria in a procurement context, storing the duplicated data sets on a data line level in a source data base, selectively extracting data contained in data lines or sets of data lines (e.g. complete data sets) from the source data base to the data warehousing layer, and gathering and accumulating the extracted data in the data warehousing layer.

Additionally, the method may comprise adding transfer information to the duplicated data sets. The transfer information may control at least one of the extraction of data from the source data base and the transfer of extracted data within the data warehousing layer. Adding transfer information to the duplicated data sets may be performed in dependence of the relevancy of an individual duplicated data set for e.g. a spend analysis that is to be performed using the data warehousing layer.

The present invention may be implemented as software, as one or more pieces of hardware, or as a combination thereof. Hence, the invention also relates to a computer program product with program code portions for performing the individual steps of the invention when the computer program product is run on one or more components of a computer network. The computer program product may be stored on a computer readable recording medium.

BRIEF DESCRIPTION OF THE DRAWINGS

Further details, embodiments, modifications and enhancements of the present invention may be obtained from consideration of the following description of various illustrative embodiments of the invention in conjunction with the drawings, in which:

FIGS. 7-9 schematically show the flow of data sets from an interface of the transaction processing layer to the information data base included in the data warehousing layer; and FIG. 10 is a schematic view generated on the basis of the information accumulated in the information data base.

DESCRIPTION OF THE EMBODIMENTS

Where appropriate, the same reference numbers will be used throughout this detailed description in conjunction with the drawings to refer to the same or like parts.

Figure 2:
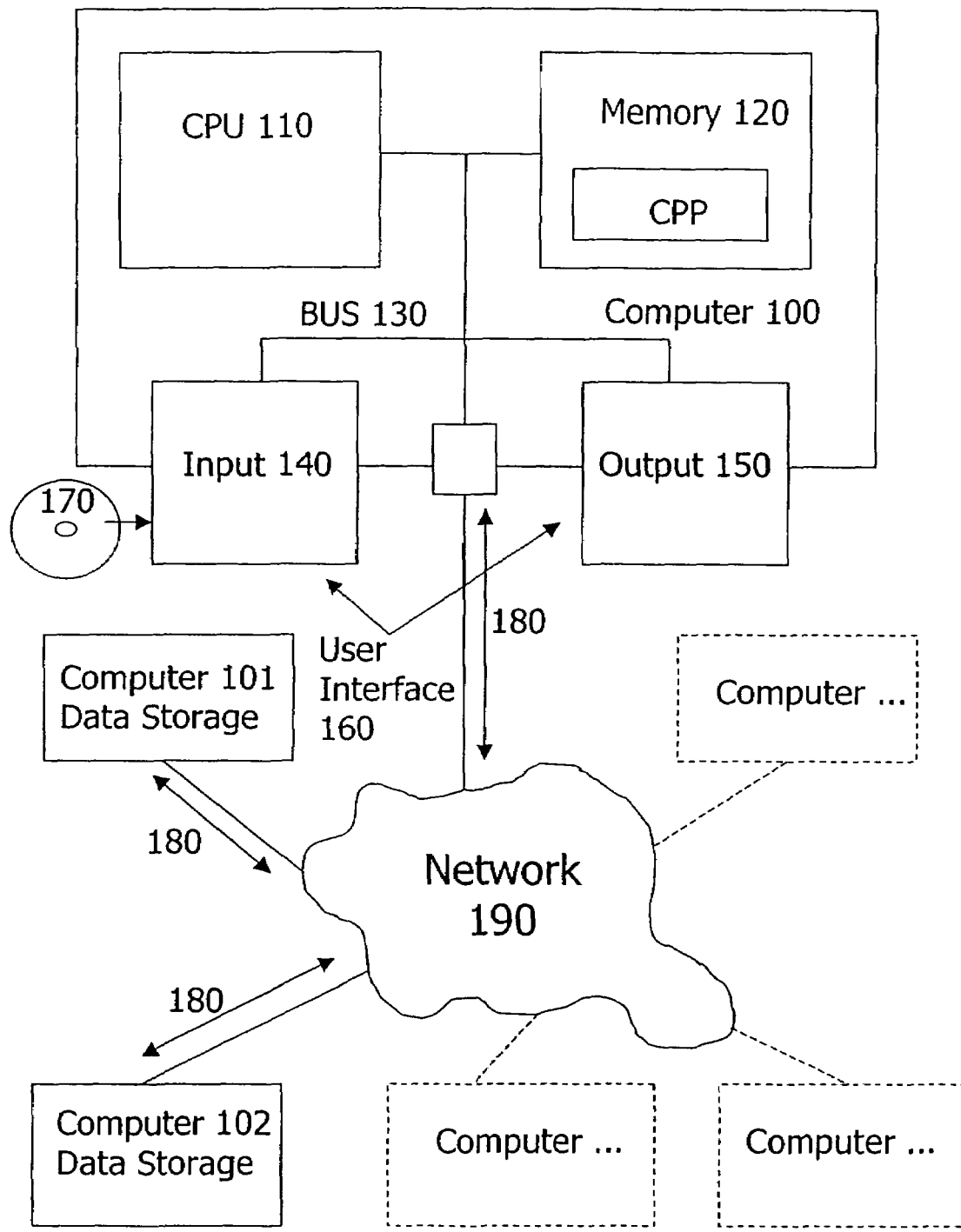
FIG. 2 is a schematic diagram illustrating the data processing system used in accordance with the present invention.

FIG. 2 illustrates a simplified block diagram of a computer network system according to the present invention having a plurality of network components 100, 101, 102, etc. that are coupled via a network 190. The network components 100, 101, 102, etc. may be realized, for example, as clients, servers, routers, peer devices or any other common network devices.

Each network component 100, 101, 102, etc. comprises a processor 110, a memory 120, a bus 130, and, optionally, one or more input devices 140 and output devices 150 (I/O devices) acting as user interface 160, interoperating in a conventionally known manner. The present invention may be embodied in a computer program product (hereinafter CPP) residing on a program carrier 170 and/or in the memory 120, and generating program signals 180, collectively called a "program".

The network components 101, 102, etc. typically may comprise many or all of the elements described with respect to the network component 100. Hence, the elements 110 to 180 in the network component 100 collectively illustrate also corresponding elements in the other network components 101, 102, etc. of the network 190.

Although the memory 120 is conveniently illustrated as a part of the network component 100, a memory function can also be implemented as an independent node in the network 190, in the other components of the network, in the processor 110 itself (e.g., cache, register), or elsewhere. Portions of the memory 120 can be removable or non-removable with respect to a particular network component. The memory 120 can store software program support modules such as, for example, a basic input output system (BIOS), an operating system (OS), a program library, a compiler, an interpreter, communication programs, drivers, protocol converters, application software programs, (Internet-) Browsers, or data base applications. Although the CPP is illustrated as being stored in memory 120, the CPP can also be located elsewhere. For example, the CPP can also be embodied on the program carrier 170.

The CPP comprises program instructions and—optionally—data or variables that cause processor 110 to execute the steps forming the methodology of the present invention. The method steps are explained in greater detail below. The CPP defines and controls the operation of the network component 100 and its interaction in the network system 190. For example, and without the intention to be limiting, the CPP can be available as source code in any programming language, and as object code ("binary code") in a compiled presentation. Persons of ordinary skill in the art can use the CPP in connection with any of the above mentioned support modules. The functionalities of one or more of the network components 100, 101, 102, etc. and of the CPP are closely related. Phrases, such as "the computer provides" or "the program provides", are used hereinafter to express actions by one or more network nodes that is/are controlled by the CPP in accordance with the invention.

The program carrier 170 is illustrated as being outside the network component 100. For communicating the CPP to the network component 100, the program carrier 170 is conveniently inserted into the input device 140. The carrier 170 is implemented as any computer readable medium. Generally, the program carrier 170 is an article of manufacture comprising a computer readable medium having computer readable program code means embodied therein for executing the method of the present invention. Further, the program signals 180 can also embody the CPP. The signals 180 travel on the computer network 190 to and from the network component 100. The steps of the computer program product CPP can be executed solely in the network component 100, in which case the computer network 190 may be omitted, or can be executed in a distributed manner in one or more of the components of the computer network 190.

The bus 130 and the computer network 190 provide logical and physical connections by conveying instructions and data signals. While connections and communications inside the network component 100 are conveniently handled by the bus 130, connections and communications between different network components are handled by the network 190. Optionally, the network 190 comprises gateways and routers being computers that are dedicatedly programmed to effect data transmission and protocol conversion. The input/output devices 140 and 150 are coupled to the network component 100 by the bus 130 (as illustrated) or by the network 190 (optional). While the signals inside the network component 100 can be mostly electrical signals, the signals in the network can be electrical, magnetic, optical or wireless (radio) signals.

The network 190 can include one or more of an office-wide computer network, an enterprise-wide computer network, an intranet or the Internet (i.e. world wide web). The world wide web (www) represents all of the computers on the Internet that offer users access to information on the Internet via interactive documents or Web pages. Web information resides on Web servers on the Internet or within company or community networks (intranets). Network 190 can include a wired or a wireless network, such as, for example, a local area network (LAN), a wide area network (WAN), a wireless LAN (WLAN), a public switched telephone network (PSTN), an integrated services digital network (ISDN), an infra-red (IR) or Bluetooth link, a radio link e.g. according to the Universal Mobile Telecommunications System (UMTS), the Global System for Mobile Communication (GSM), a Code Division Multiple Access (CDMA) system, or satellite link.

Transmission protocols, mechanisms and data formats to effect communications between network components which are connected to and by the network 190 are known, for example, as transmission control protocol/internet protocol (TCP/IP), hyper text transfer protocol (HTTP), secure HTTP, wireless application protocol (wap), unique resource locator (URL), unique resource identifier (URI), hyper text markup language HTML, extensible markup language (XML), extensible hyper text markup language (XHTML), wireless application markup language (WML), electronic data interchange (EDI), which is an electronic exchange of business information between or inside organizations and their information technology (IT) infrastructure in a structured format, remote function call (RFC), or via an application programming interface (API), etc.

Interfaces coupled between individual elements and components are also well known in the art. For simplicity, interfaces are not illustrated. An interface can be, for example, a serial port interface, a parallel port interface, a game port, a universal serial bus (USB) interface, an internal or external modem, a video adapter, or a sound card.

The CPP according to the present invention can be part of a complex software system embedded in a hardware structure. The cooperation of the software system and the hardware structure is sometimes referred to as IT backbone system. The backbone system can have a layered structure with individual software components acting in accordance with the client/server concept as service providers, service requesters, or both. For example an application software can include software components that provide services for presentation, acting as a server. But at the same time the application software also can act as service requester of data base services provided by a lower layer. The layered components can communicate with each other via predefined (hardware and software) interfaces.

As regards a possible implementation of a layered software structure, a lower layer may include network-related functionalities, a physical data base and an operating system for the network components. A middle layer that interfaces with the lower layer integrates software applications in the upper layer above it. This middle layer may include components like software tools, system administration tools, data handling tools, authorization and security management tools, cross-application modules, and a system kernel. The system kernel can use communications and application program interfaces to access components like application software in the upper layer or the operating system, the data base, and the network in the lower layer. This system kernel can operate independently from the applications and is located "under" the application software and the data layers of the software system. The upper layer contains the different software applications for controlling and monitoring processes relating for example to the management of human resources, sales and distribution, financials, materials, manufacturing, electronic procurement etc.

Figure 3:
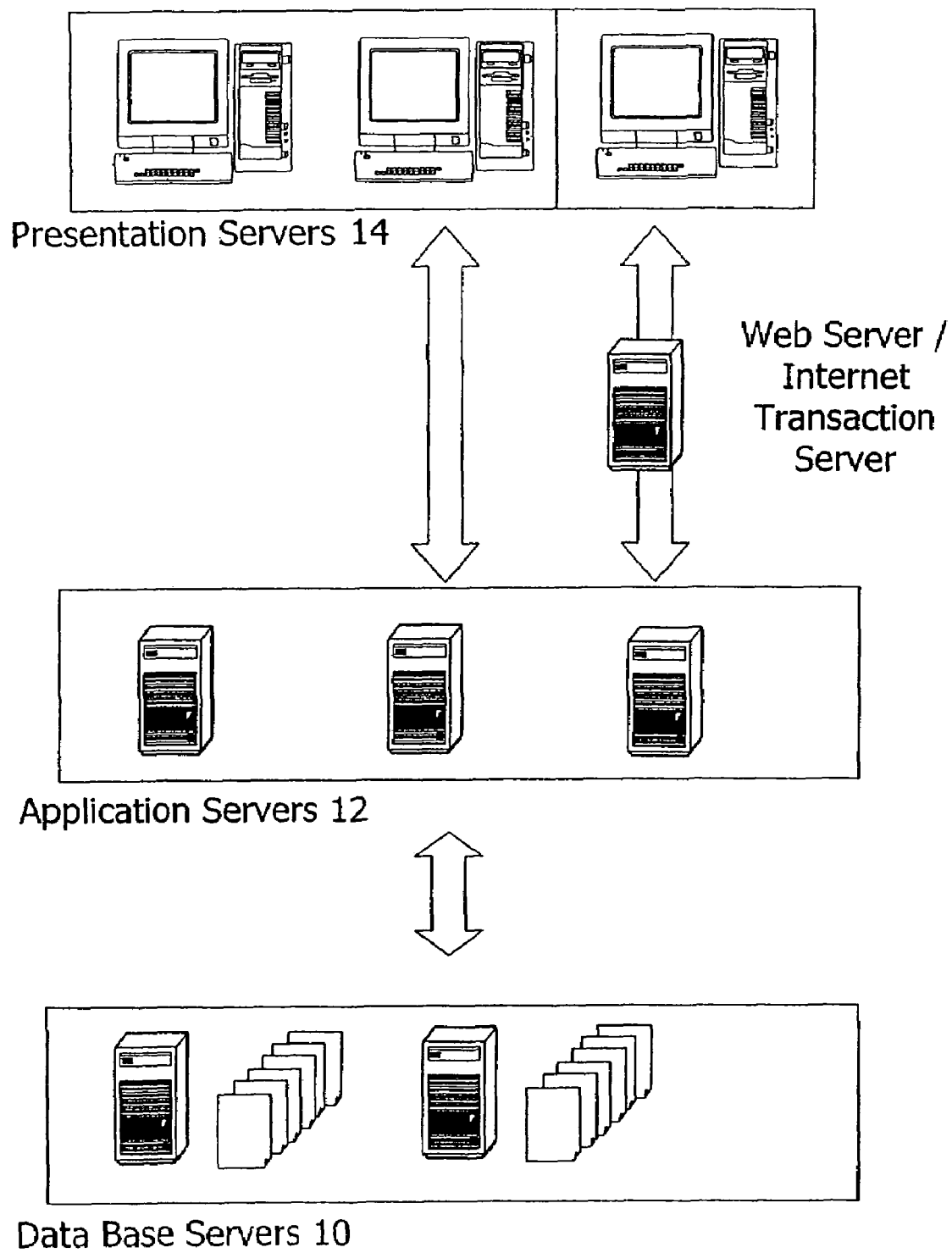
FIG. 3 is a schematic diagram illustrating a hardware-oriented view of a three-tiered server configuration of a computer network architecture according to the present invention.

One possible client/server configuration in which the present invention can be carried out is a so-called three-tiered network architecture which separates a network system's components into three functional groups: presentation, application, and data base. This is illustrated in FIG. 3 in a hardware-related view. As can be seen from FIG. 3, the three-tiered architecture comprises one or more data base servers 10, one or more application servers 12 and one or more presentation servers 14.

With the three-tiered architecture shown in FIG. 3, each hardware group can be set up to support demands of its functions. The one or more data base servers 10 include the data sources. Application servers 12 interfacing the data base servers 10 include the main processing logic as regards data warehousing. The tasks related to data presentation are handled by presentation servers 14, which can typically be personal computers or work stations. External presentation servers 14 may be connected to the application servers 12 via the Internet and Web servers/Internet transaction servers. Communication among the three tiers can be accomplished using for example the standard protocol services mentioned above, such as the ones provided by TCT/IP or CPIC. CPIC stands for Common Programming Interface Communication and includes standard functions and services for program-to-program communication.

Figure 4:
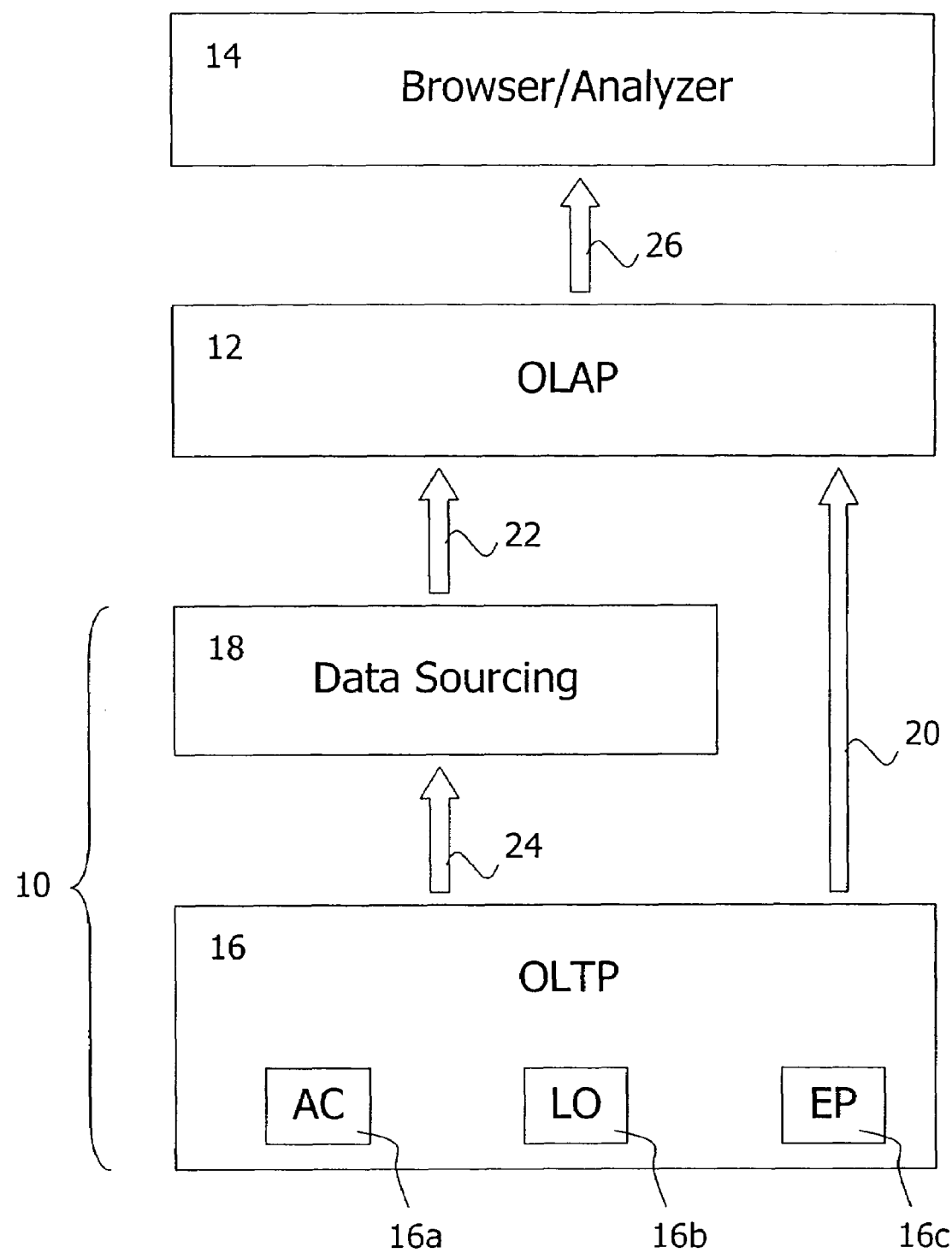
FIG. 4 is a schematic diagram illustrating in a functional view the computer-network architecture in accordance with the present invention.

The three-tiered network architecture depicted in FIG. 3 is shown in FIG. 4 in a functional, software-related view. As becomes apparent from FIG. 4, the software components utilized in context with the present invention include a data base layer 10, an application layer 12 and a presentation layer 14.

The data base layer 10 includes an OLTP based transaction processing layer 16 with several ERP components like an accounting component 16a, a logistics component 16b and an electronic procurement (EP) component 16c. It should be noted that although in context with the data warehousing approach of the present invention the transaction processing layer 16 serves as data source and is thus included in the data base layer 10, it may internally also be based on a three-tiered architecture like the one shown in FIG. 3 including associated data bases, applications (accounting, logistics, EP, etc.) and user interfaces for data presentation.

As becomes apparent from FIG. 4, the data base layer 10 additionally includes a data sourcing layer 18 that is arranged between the transaction processing layer 16 and the application layer 12. The data sourcing layer 18 constitutes one of the core aspects of the present invention and will be described in more detail below with reference to FIGS. 5A to 5C. The data base layer 10 including the transaction processing layer 16 and the data sourcing layer 18 constitutes the network architecture's bottom layer that in the context of this embodiment mainly performs data sourcing tasks.

The middle layer, i.e. the OLAP based data warehousing layer 12, basically carries out three tasks: it administers the data warehouse system, stores the data extracted from the data base layer 10 and provides requested data to the presentation layer 14. As can be seen from FIG. 4, the data warehousing layer 12 receives two different data streams. As indicated by arrow 20, the data warehousing layer 12 receives a first data stream directly from the individual components 16a, 16b, 16c arranged in the transaction processing layer 16. Additionally, the data warehousing layer 12 receives a second data stream indicated by arrow 22 from the data sourcing layer 18. The data sourcing layer 18 in turn receives a data stream indicated by arrow 24 from the transaction processing layer 16 and in particular from the accounting component 16a. As can be seen from FIG. 4, the first data stream (arrow 20) bypasses the data sourcing layer 18 for reasons that will be explained in more detail below.

As indicated by arrow 26, the data warehousing layer 12 provides data for the top layer, i.e. the presentation layer 14. The presentation layer 14 constitutes a reporting environment. In the implementation depicted in FIG. 4 the presentation layer 14 includes two individual components, namely a browser and an analyzer. The browser works much like an information center, allowing to organize and access all kinds of information. The analyzer can be a conventional data analysis tool like Microsoft Excel or a similar application.

Figure 5A:
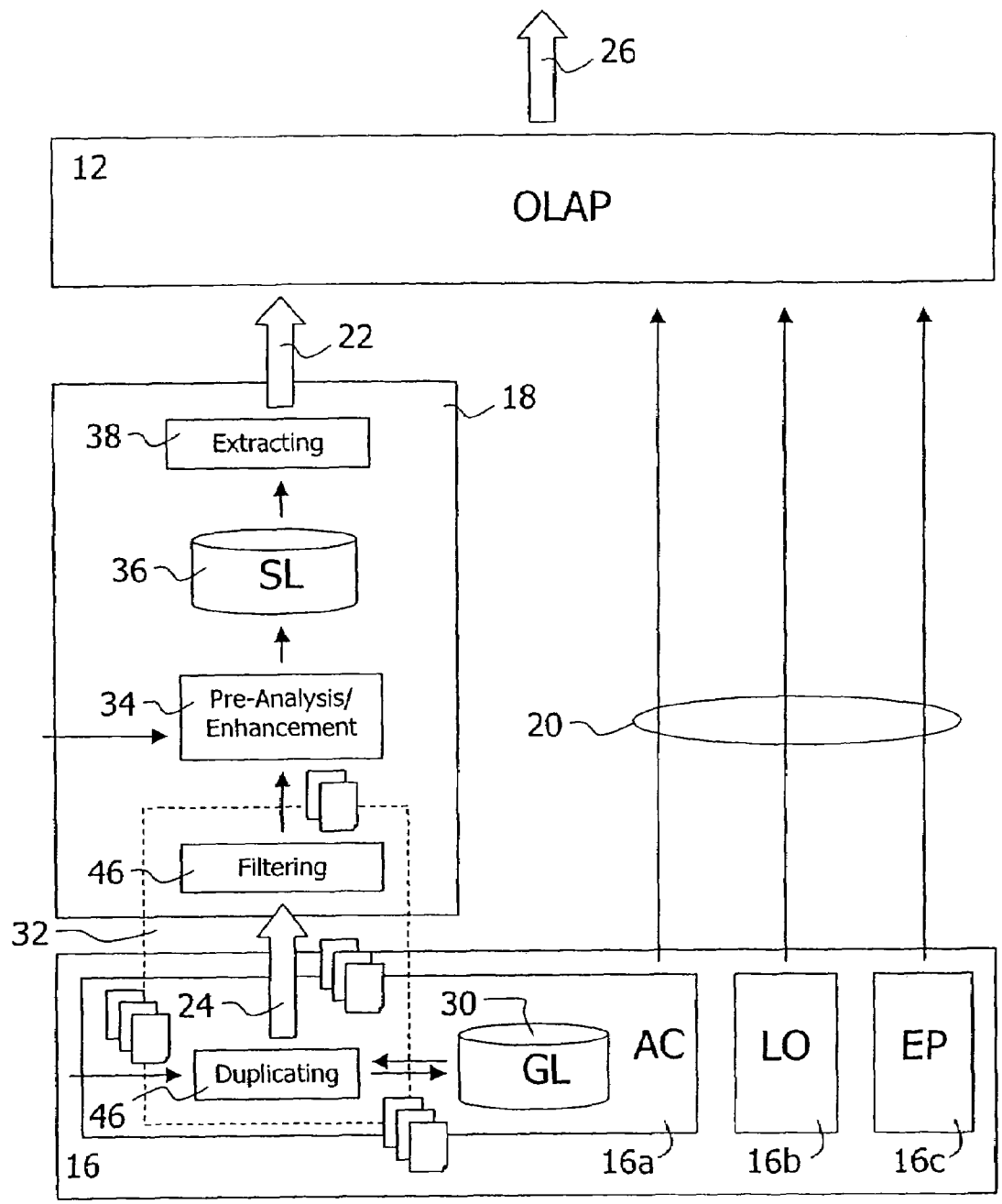
FIGS. 5A-5C are schematic diagrams illustrating in more detail the configuration of the individual components of the computer network architecture shown in FIG. 4.

The configuration of the data base layer 10 of FIG. 4 is shown in more detail in FIG. 5A. As becomes apparent from FIG. 5A, both the accounting component 16A included in the transaction processing layer 16 and the data sourcing layer 18 comprise a plurality of individual components. The accounting component 16A includes a general ledger data base 30 and a part of a duplicator 32, which spans the transaction processing layer 16 and the data sourcing layer 18. The data sourcing layer 18 includes a further part of the duplicator 32 and a component 34 for pre-analyzing and enhancing (e.g. formatting) the data received from the duplicator 32. Additionally, the data sourcing layer 18 includes a source data base 36, also called special ledger (SL) data base, and an extractor 38. Although the extractor 38 is schematically shown in FIG. 5A as part of the data sourcing layer 18, one or more functional entities of the extractor 38 could also be part of the data warehousing layer 12.

In the following, the co-operation of the accounting component 16a and the data sourcing layer 18 as well as the tasks performed by the data sourcing layer 18 will be considered in more detail.

In the exemplary embodiment described hereinafter, the provision of procurement-related information that may be used for global spend analysis in the data warehousing layer 12 will exemplarily be described. It should be noted, however, that the individual technical components and technical mechanisms described hereinafter are to a large extent independent from the specific analysis task that is to be performed using the data warehousing layer 12. More specifically, the invention can generally be employed in data warehousing scenarios for efficiently transferring information available in a dispersed manner on an OLTP level to an OLAP—based data warehousing application.

As becomes apparent from FIG. 5A, the accounting component 16A continuously processes a stream of transaction-based accounting-related data sets. Although accounting-related data sets can be received from outside the accounting component 16a, the stream of accounting-related data sets may also include data sets that have been generated within the accounting component 16a itself. Within the accounting component 16a, the individual data sets are posted and finally stored in the central data base of the accounting component 16a, i.e. in the general ledger data base 30.

The accounting-related data sets include data sets relating to invoices, credit memos and their cancellations (reverse invoice/reverse credit memo) coming from the logistics component 16b, the EP component 16c, from the accounting component 16a itself and/or any other component included in the transactional processing layer 16. Associated account payable information is directly generated by means of an accounting transaction within the accounting component 16a.

The accounting-related data sets concerning invoices, credit memos and their cancellations are generally procurement-related and available to the accounting component 16a regardless of the individual procurement channel. This means that for example an accounting-related data set for an invoice will be processed within the accounting component 16a regardless of the fact whether the associated procurement involved the EP component 16c or any traditional procurement approach like ordering goods or services via telephone. It should be noted that the accounting-related data sets that will have to be posted and stored by the accounting component 16a also include data sets that are not procurement-related but have to be processed in e.g. a sales accounting or asset accounting context.

Regardless of their relevancy in a procurement context, all accounting-related data sets that will eventually be stored in the general ledger data base 30 are first received by the duplicator 32, which is arranged in the data path before the general ledger data base 30. The duplicator 32 is configured to additionally or alternatively receive accounting-related data sets that have been retrieved from the general ledger data base 30, i.e. that have been stored earlier. The duplicating component 44 duplicates the accounting-related data sets before they are stored in the general ledger data base 30 or after they have been retrieved from the general ledger data base 30.

The duplicator 32 includes two separate functional entities, namely a duplicating component 44 and a filter 46. In the embodiment depicted in FIG. 5A the filter 46 is arranged in the data sourcing layer 18, whereas the duplicating component 44 is arranged in a transaction processing layer 16 and more specifically in the accounting component 16a before the general ledger data base 30.

In order to avoid any processing delays within the accounting component 16a, the duplicating component 44 simply generates copies of the received accounting-related data sets without performing any data analysis or data enrichment tasks. The duplicates of the accounting-related data sets received by the duplicator 32 are output to the data sourcing layer 18 via a dedicated accounting interface (not shown) of the accounting component 16a. The original accounting-related data sets are simply forwarded by the duplicating component 44 for being processed further within the accounting component 16a and for being finally stored in the general ledger data base 30.

It should be noted that the distinction between duplicated data sets and original data sets is somewhat artificially chosen in order to illustrate the mechanism performed by the duplicator 32. In the actual implementation duplicates and originals can often not be distinguished at the output of the duplicating component 44. For the sake of clarity, however, the accounting-related data sets transferred from the transaction processing layer 16 to the data sourcing layer 18 are referred to as "duplicated" data sets here.

The duplicated accounting-related data sets output via the accounting interface (not shown) in the transaction processing layer 16 are transferred to the data sourcing layer 18. More specifically, the duplicated data sets are fed to the filter 46 of the duplicator 32. The filter 46 is selectively transmissive for such duplicated data sets that fulfill a predefined criteria in a procurement context. In the present embodiment, the filter 46 analyzes the duplicated data sets with respect to account type codes related to creditors that may or may not be included in the duplicated data sets. As will be explained below with reference to FIG. 7, the filter 46 is configured to output only such duplicated data sets that contain the creditor type code "K", the creditor type code "K" being in the present embodiment indicative of the duplicated data set's procurement relevancy. The remaining duplicated data sets having no procurement relevancy may be discarded. The combination of duplicating component 44 and filter 46 thus selectively outputs only duplicates of such accounting-related data sets that include one or more pre-defined account codes and that are to be handled further within the data sourcing layer 18.

Figure 5C:
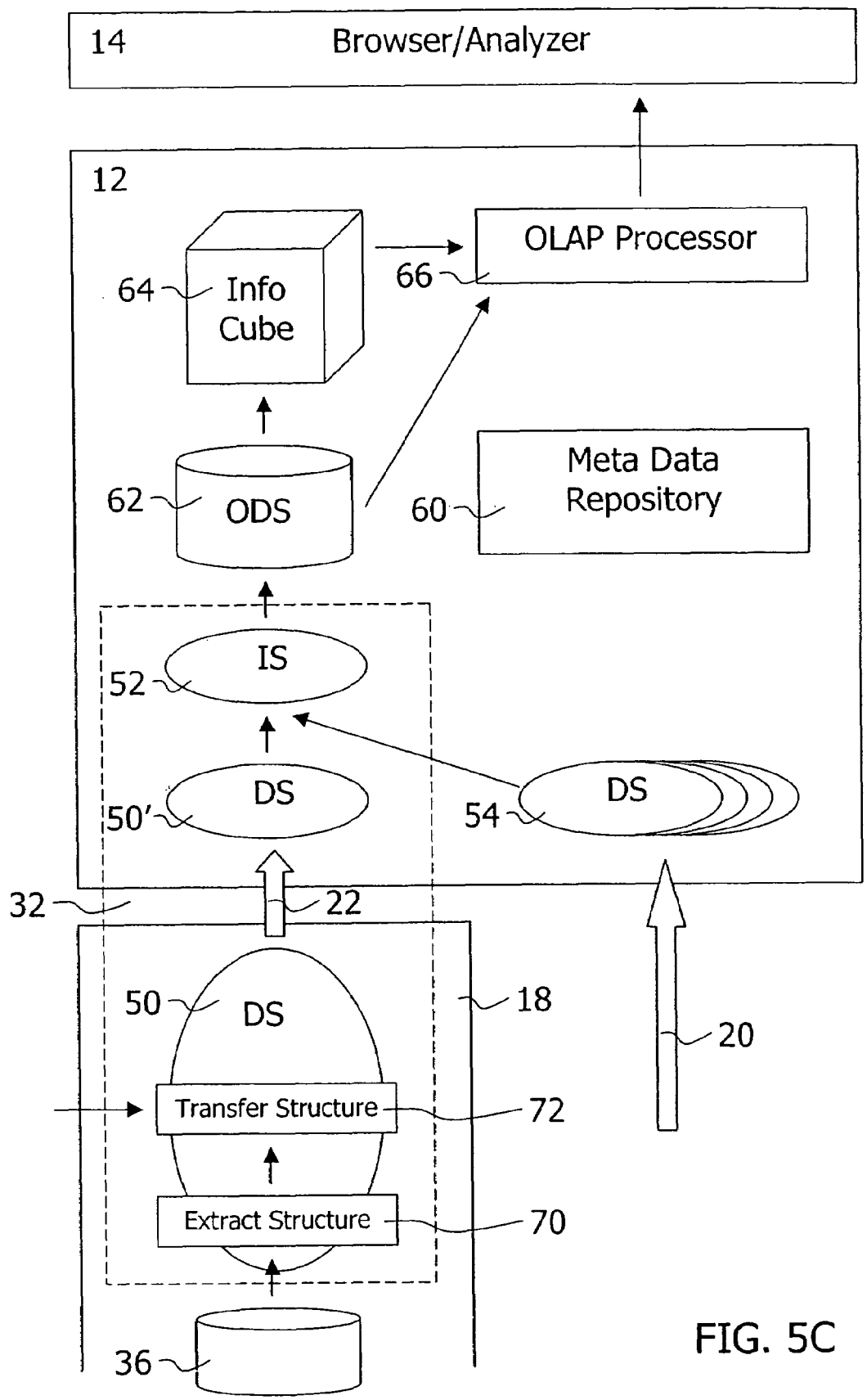
Figure 5B:
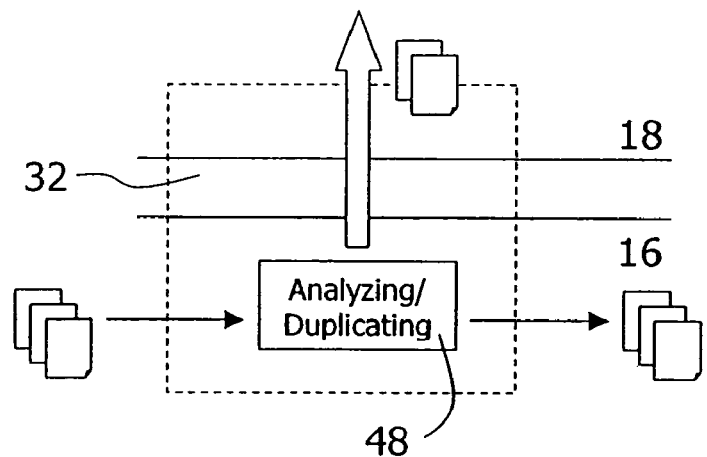

FIG. 5B shows an alternative configuration of the duplicator 32. The duplicator 32 shown in FIG. 5B includes only a single component 48 that is completely arranged within the transaction processing layer 16. The component 48 is configured to receive all accounting-related data sets that will be stored in the general ledger data base. The component 48 first analyzes the accounting-related data sets with respect to the presence of one or more pre-defined account type codes and then selectively duplicates only such accounting-related data sets that contain at least one pre-defined account type codes. Only the selectively duplicated data sets are output via the accounting interface (not shown) to the data sourcing layer 18. The single component 48 shown in FIG. 5B may be split into two individual components, one of the two components performing the analysis task and the other component the duplicating task. Whereas the duplicator variant described in context with FIG. 5A prevents or at least minimizes processing delays within the accounting component 16a, the duplicator 32 shown in FIG. 5B drastically reduces the amount of data transferred between the transactional processing layer 16 and the data sourcing layer 18.

Returning to FIG. 5A, the duplicated data sets output by the duplicator 32 are fed to a component 34 for data pre-analysis and data enhancement. The individual tasks performed by the component 34 may be implemented in a customized manner. The component 34 may thus append, delete and/or fill data fields belonging to the duplicated data sets in accordance with a user-defined mechanism. To this end the component 34 is provided with a dedicated user interface.

As regards data analysis tasks, the component 34 analyzes the duplicated data sets received from the duplicator 32 with respect to the specific data analysis that is to be performed using the data warehouse. As mentioned above, in the present embodiment the procurement-related, duplicated data sets are analyzed to determine whether or not they are relevant for global spend reporting. Depending on the result of this analysis, the component 34 selectively adds transfer information in the form of e.g. a flag setting that is characteristic of duplicated data sets that are spend relevant. As will be described in more detail with reference to FIG. 7, only such duplicated data sets are marked spend relevant that include a pre-defined posting key or that have been specifically identified (using e.g. a particular user flag setting that is already included in the duplicated data set as identifier).

As has been mentioned above, transfer information is added to all spend-relevant duplicated data sets. To that end, one or more additional data fields are appended to the spend-relevant data sets and an appropriate flag is written into the one or more appended data fields. The flag setting will later be used as control information for extracting data from the source data base 36. It should be noted here, however, that the duplicated data sets output by the duplicator 32 are stored in the source data base 36 regardless of whether or not (or which) transfer information has been added. In other words, in the present embodiment the transfer information does not specify whether or not a duplicated data set is to be stored in the source data base 36 but determines whether or not data contained a data set stored in the source data base 36 is actually extracted to the data warehousing layer 12. The source data base 36 thus also includes procurement-related data sets have not been marked as spend relevant.

The component 34 is not only configured to add transfer information to a duplicated data set but additionally allows to format the duplicated data sets. The individual formatting mechanisms strongly depend on the original format in which duplicated data sets are provided. If the duplicated data sets are provided in the form of one or more individual data lines, the formatting may take place on a data field or on a data line level. Since any further transfer and processing of a duplicated data set may be performed on a data line level, formatting of the duplicated data sets on a data line level already in the data sourcing layer is advantageous as regards evenly distributing the processing tasks among the individual layers of the computer network architecture of the present invention.

The individual data sets output by the component 34 are stored on a data line level, i.e. with a high granularity, in the source data base 36. The source data base 36 is configured as a single item table and exclusively used in context with the particular procurement-related analysis that is to be performed in the data warehousing layer 12, i.e. spend analysis.

From the source data base 36 the extractor 38 extracts individual data sets or data lines into the data warehousing layer 12 in dependence of the transfer information that has been added to the data sets by the component 34. This means in the present embodiment that only such data sets or data lines stored in the data source 36 will be transferred from the data sourcing layer 18 to the data warehousing layer 12 that have the appropriate flag setting "spend relevant". The remaining data sets that have not been marked as relevant for this particular analysis task need not be extracted and can be deleted or archived (if necessary together with the extracted data sets) in regular time intervals.

The extractor 38 has two different modes of operation. In the first operational mode the extractor 38 updates the data warehousing layer 12 according to a so-called delta update mechanism. This means that the extractor 38 batch-wise extracts only such data sets or data lines from the source data base 36 which have been stored in the source data base 36 since the last updating process and which additionally have the appropriate flag setting. In order to facilitate implementation of the delta updating process each data set stored in the source data base 36 may be provided with a time stamp. The delta updating process described above is advantageous as regards extraction of data sets from the source data base 36 that correspond to such accounting-related data sets on the transactional level that have newly been created and that have been duplicated by the duplicator 32 prior to having entered the general ledger data base 30 (direct posting).

For historical set ups of the source data base 36 with information directly retrieved from the general ledger data base 30 a different updating approach may be implemented (second operational mode of the extractor 38). This updating approach includes transferring historical accounting-related data sets or corresponding information from the general ledger data base 30 via the duplicator 32 to the source data base 36 (subsequent posting) and extracting the complete content of the source data base 36 to the data warehousing layer 12.

The extraction mechanism used to transfer data from the source data base 36 to the data warehousing layer 12 as well as the construction and function of the data warehousing layer 12 will now be described in more detail with reference to FIG. 5C. As becomes apparent from FIG. 5C, the extractor 38 in the present embodiment not only belongs to the data sourcing layer 18 but spans both the data sourcing layer 18 and the data warehousing layer 12. More specifically, the extractor 38 includes on the data sourcing level a data source 50 that is replicated on the data warehousing layer (reference numeral 50') and an information source 52 that is arranged in the data warehousing layer 12 and loaded with data from the replicated data source 50'.

The information source 52 may be configured to also load information provided from one or more additional data sources 54. These additional data sources 54 may for example contain data provided directly from the transaction processing layer 16 depicted in FIG. 5A (arrow 20). Hence, the further data sources 54 may include data provided from the logistics component 16B or the EP component 16C. The extractor 38 may thus merge ("enrich") data extracted from the source data base 36 with data extracted from data bases arranged in the transaction processing layer 16 of FIG. 5A.

Besides several components of the extractor 38 and the one or more additional data sources 54, the data warehousing layer 12 includes a meta data repository 60 that contains information about the data warehouse, at least one operational data base 62 (also called operational data store, ODS), at least one information data base 64 (also called Info Cube), and an OLAP processor 66. The operational data base 62 is used for updating the information data base 64. In contrast to the information data base 64, the operation data base 62 stores the data provided by the extractor 38 in a non-aggregated manner on a data line level. The operational data base is primarily used for detail reporting, rather than for dimensional analysis like the information data base 64. The information data base 64, on the other hand, is configured to aggregate data received from the operational data base 62 and to allow for a multi-dimensional data analysis.

The extraction of data from the source data base 36 into the operational data base 62 and the updating of the information data base 64 on the basis of the data contained in the operational data base 62 will now be described in more detail.

As becomes apparent from FIG. 5C, the data source 50, which belongs to the extractor 38 and is arranged in the data sourcing layer 18, includes an extract structure 70 and a transfer structure 72. Data retrieved by the extractor 38 from the source data base 36 are first loaded into the extract structure 70. The extract structure has a predefined flat format specific for the source data base 36. The data contained in the source data base 36 are loaded on a data set-to-data set basis into the extract structure 70. The loading of data into the extract structure 70 includes the processing of extracted data according to a data format specified by the extract structure.

From the extract structure 70 the data are loaded into the transfer structure 72, which determines the content of the data source 50. In contrast to the extract structure 70, the transfer structure 72 allows to append further information (data fields) to the data provided by the extract structure 70. Thus, the transfer structure is a another option for merging data from further components of the transaction processing layer with data retrieved via the extract structure 70 from the source data base 36. Using the functionalities of either one or both of the transfer structure 72 and the one or more additional data sources 54, the extractor 38 allows to combine specific procurement-related data like data contained in purchase order data sets (purchaser, material, material group etc.) provided by the logistics component 16B or the EP component 16c of FIG. 5A with the associated accounting-related data provided by the accounting component 16a via the data sourcing layer 12.

The transfer structure 70 provides data in a format that is required or advantageous as regards the tasks performed in the data warehousing layer 12. In the present embodiment, the data set formatting performed by the transfer structure 72 includes splitting such data lines retrieved from the source data base 36 that contain several specific numerical values (e.g. a transaction value in different currencies) into two or more individual data lines, each data line containing a single numerical value. Although this formatting increases the number of data lines associated with a particular data set extracted from the source data base 36, it helps to accelerate and facilitate the aggregation and accumulation tasks performed in the data warehousing layer 12.

Meta data specifying details about the data source 50, i.e. the extract structure 70 and the transfer structure 72, are stored in the data sourcing layer 18. In order to define a data flow within the data warehousing layer 12 on the basis of the data source 50, the meta data characteristic of the data source 50 are replicated from the data sourcing layer 18 to the data warehousing layer 12. The replicated meta data are stored in the meta data repository 60 of the data warehousing layer 12 and define the data source 50' in the data warehousing layer 12.

From the replicated data source 50' arranged in data warehousing layer 12 the data are loaded according to predefined transfer rules into the information source 52. The information source 52 specifies a target structure of homogenized and consolidated data that logically form a single unit. The data provided by the information source 52 thus have a format which allows transferring the data in a predefined data model and using the data for data analysis.

The core features of the information source 52 are on the one hand the target structure in which the data are to be transferred during homogenization and on the other hand transfer rules that specify how this target structure can be reached using the information provided by one or more data sources 50', 54. In the present embodiment, the transfer rules specify that only data pertaining to data sets that include appropriate transfer information are loaded from the transaction structure of the data source 50' into the target structure of the information source 52. As has been mentioned above, this transfer information includes the setting of a flag indicating the relevancy of a particular data set for spend analysis (see FIG. 7). The transfer rules are thus used in combination with the transfer information for filtering the data sets stored in the source data base 36. Meta data specifying the transfer rules and the target structure used by the information source 52 are stored in the meta data repository 60.

The operational data base 62 is updated by the information loaded into the information source 52. More specifically, the data pertaining to a particular data set extracted from the source data base 36 are loaded from the target structure of the information source into an ODS object having the same structure as the target structure. Update rules may be defined that specify the transfer of data from the information source 52 to the operational data base 62 in more detail. The update rules are stored in the meta data repository 60.

After loading extracted data into an ODS object in the operational data base 62, the data included in the ODS object may be aggregated according to predefined update rules in the information data base 64 for multi dimensional analysis.

Figure 6:
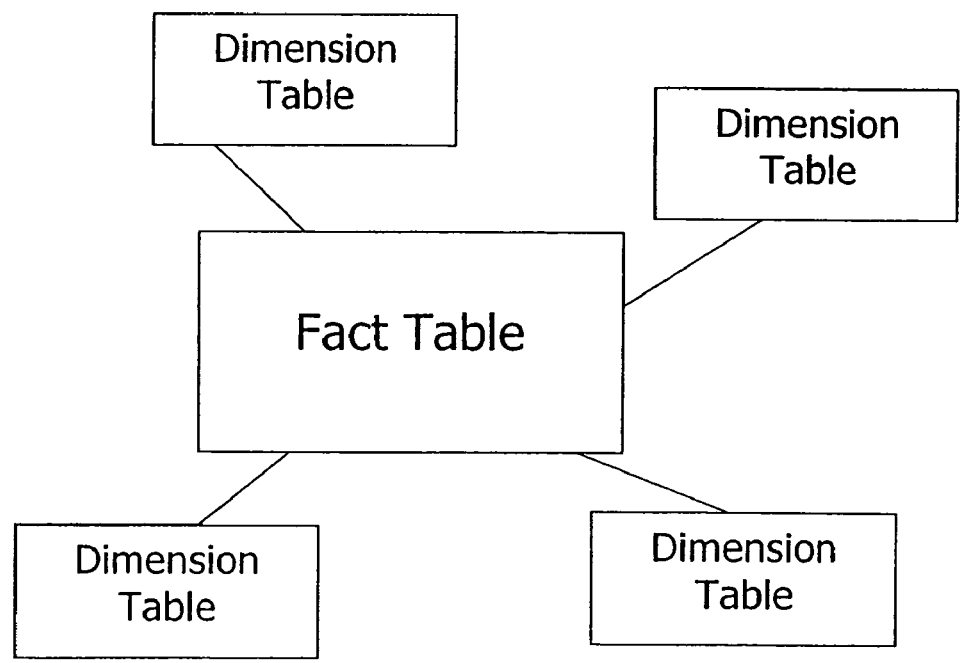
FIG. 6 is a schematic diagram illustrating an information data base incorporating a star schema.

The structure of the information data base is schematically depicted in FIG. 6. As becomes apparent from FIG. 6, the information data base 64 is based on a star schema including a fact table appearing in the middle of FIG. 6 as well as several surrounding dimension tables. The central fact table is rather large (several gigabytes) and is used to retrieve the data requested by the OLAP processor 66. The size of the dimension tables amounts to only a few percent of the size of the central fact table. As is known in the art, foreign keys are used to tie the fact table to the dimension tables. The special design technique of the information data base shown in FIG. 6 greatly facilitates data retrieval for the analytical processing to be performed by the OLAP processor 66.

Now, the exemplary flow of an accounting-related data set comprised of several data lines from the accounting interface of the transaction processing layer to the information data base 64 will be described with reference to the functional components depicted in FIGS. 5A and 5C on the one hand and the data set transformation depicted in FIGS. 7 to 9 on the other hand.

Figure 7:
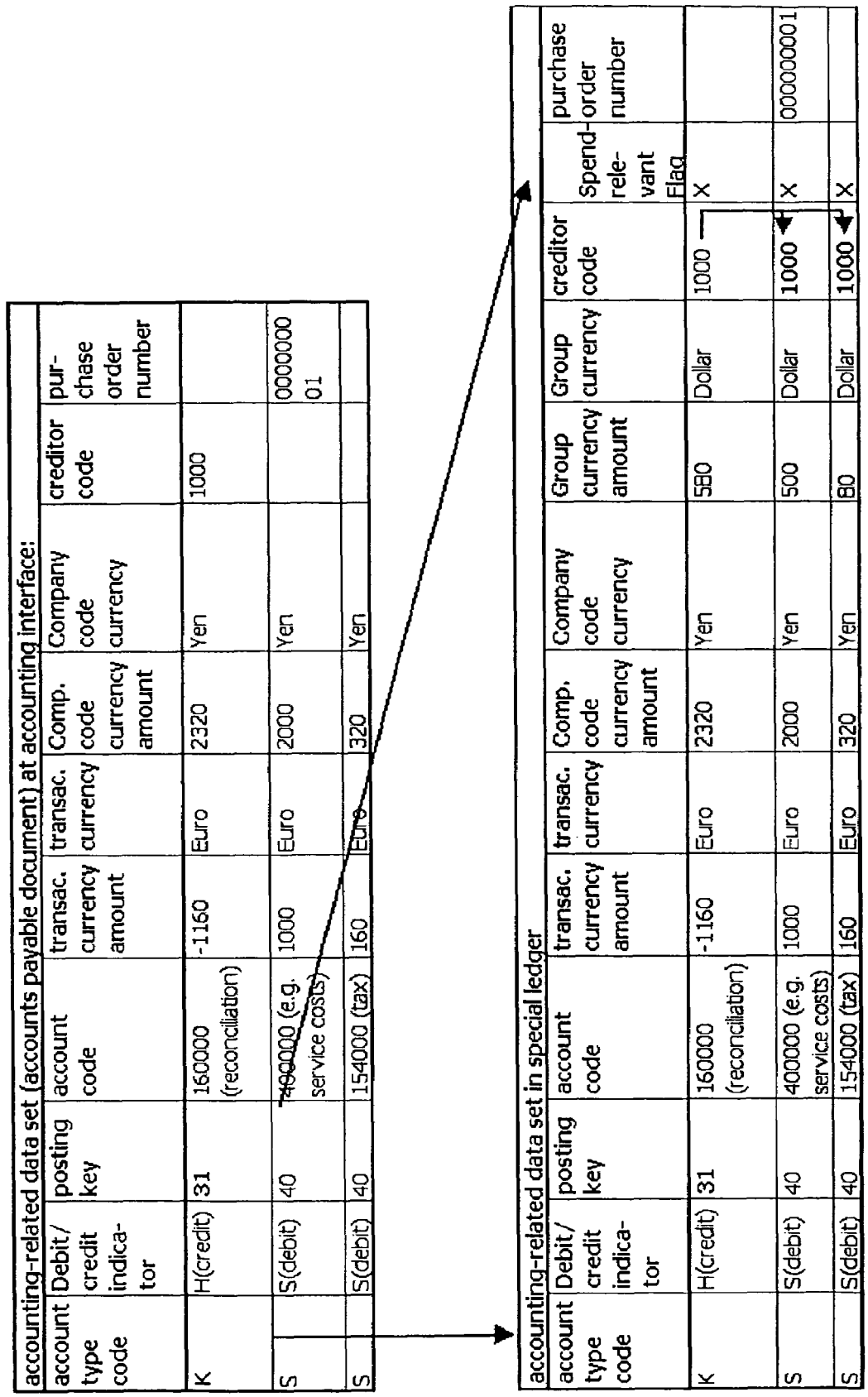

The upper half of FIG. 7 shows a duplicated accounting-related data set output via the accounting interface in the transaction processing layer 16. This accounting-related data set is comprised of three data lines associated with the individual items that are to be posted. Each data line comprises several data fields that specify an account type code, a debit/credit indicator, a posting key, an account code, a value in a transaction currency, a specification of the transaction currency, an amount in a company currency, a specification of the company currency, a creditor code and a reference to a purchase order data set associated with the particular accounting-related data set.

The filter 46 of the data sourcing layer 18 is coupled to the accounting interface and configured to be transmissive for such duplicated data sets that contain the account type code "K" for "Kreditor" (and are thus assumed to be procurement relevant). The duplicated data set depicted in the upper half of FIG. 7 includes the account type code "K" in the first data line and consequently passes the filter 46, which feeds component 34 for data pre-analysis and data formatting. It should be noted that not only the individual data line containing the account type code "K" is selected but the whole data set including the remaining data lines containing the account type code "S" for "Sachkonto".

The component 34 analyzes the posting key assigned to the duplicated data set received from the filter 46. Depending on the posting key, the component 34 marks a duplicated data set as spend relevant. In the present embodiment a duplicated data set is considered to be spend relevant if the posting key indicates that the duplicated data set relates to an invoice data set, a credit memo data set, a reverse invoice data set or a reverse credit memo data set (in the present embodiment the posting keys 21, 22, 31 and 32, respectively, have been assigned to these data sets). In the case depicted in FIG. 7 the duplicated data set includes the posting key 31 and is thus considered to be spend relevant. Accordingly, the component 34 appends to the individual lines of the duplicated data set an additional data field titled "spend relevant" and fills this field line-wise by setting a flag "X" indicating spend relevancy. Instead of analyzing a posting key, the component 34 may be configured to analyze additional or alternative information included in the duplicated data set. Such information may relate to a user flag setting "sales related" (not depicted for the accounting-related data set shown in FIG. 7).

Besides appending further data fields and setting the associated flag, the component 34 inherits the creditor code originally included in only one data line of the duplicated data set to the remaining two data lines. This facilitates the line-wise processing in the data warehousing layer. Moreover, the component 34 column-wise moves individual data fields and enriches the duplicated data set with data fields relating to values in a transactional currency and in a company group currency. This data enrichment in the data sourcing layer 12 allows for a more detailed spend analysis in the data warehousing layer 12. The data set thus obtained (see lower half of FIG. 7) is output by the component 34 and stored in the source data base 36.

Since the newly stored data set contains the appropriate flag setting in the appended data field "spend relevancy", it will be extracted from the source data base 36 as explained before during the next extraction process, formatted, enriched (if necessary) and used to update the operational data base 62. The extraction process involves the data source 50' and the information source 52. In context with the overall object of providing information for spend analysis, the extracted data set contains more information than is actually needed. Thus, the data transfer rules specify that only the relevant fields of data sets originally provided by the source data base 36 are mapped from the data source 50' to the information source 52.

The data fields mapped to the information source are stored as ODS object in the operational data base 62 in the format shown in FIG. 8. As becomes apparent from FIG. 8, the individual lines of the data set stored in the source data base 36 have additionally been split such that each individual line of the data set stored in the operational data base 62 includes only a single value per data line. More specifically, each data line extracted from the source data base 36 has been split in three data lines, a first data line specifying a value in a transaction currency, a second data line specifying a value in a company currency and a third line specifying a value in a company group currency. As becomes apparent from FIG. 8, the data sets stored in the operational data base 62 are of a rather high granularity, i.e. contain rather detailed information. Data granularity of the operational data bases includes data set level and day (posting date and other dates). For reporting purposes the operational data base 62 is directly accessible from the OLAP processor 66.

The information contained for a specific data set in the operational data base 62 is used to update the information data base 64. To this end the individual amounts contained in the plurality of data sets stored in the operational data base 62 are accumulated for individual account types. The update rules from the operational data base 62 to the information data base 64 specify that the spend volume be calculated for each currency type in an individual line. The data structure of a data set stored in the information data base 64 is exemplarily shown in FIG. 9. It should be noted that the structure shown in FIG. 9 is based on the assumption that only a single data set has yet been retrieved from the operational data base 62. Consequently, no actual accumulation of individual values has yet been performed.

The information data base 64 contains the whole spend volume of a company or company group. It is configured to allow e.g. for an analysis for which material, material group, account or account group the company spend money in a specific period of time per vendor. The global spend is provided in three currencies (transaction currency, company currency, group currency). The information data base 64 is configured to allow reporting on various levels, including creditor, plant, cost center, material etc. Data granularity of the information data base 64 includes month, calendar quarter, calendar year and fiscal periods.

Figure 1:
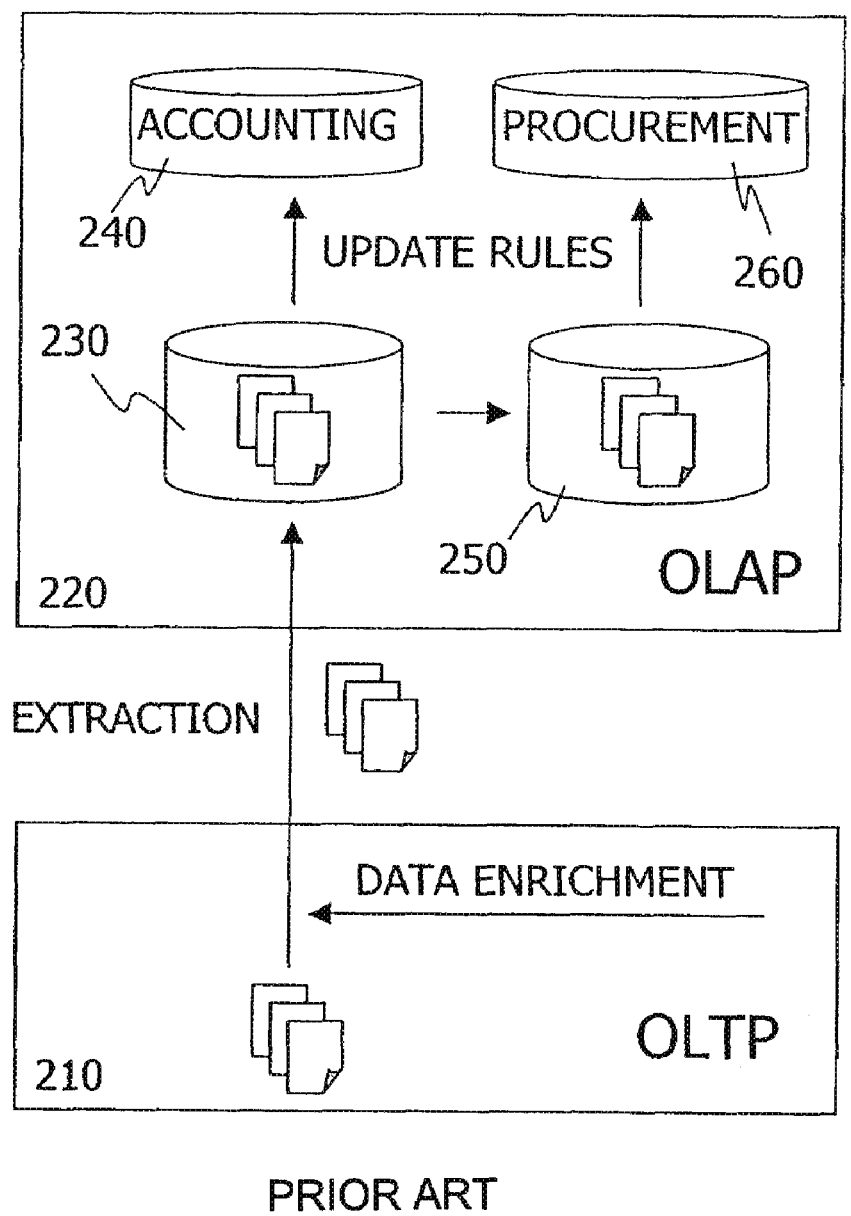
FIG. 1 is a schematic diagram illustrating an exemplary technical realization of a computer network architecture for making procurement-related information available to data warehousing techniques.

Based on the data contained in the information data base 64, the OLAP processor 66 may compose reports for being presented by the analyzer 14 as depicted in FIG. 10. As becomes apparent from FIG. 10, the invention allows to make detailed procurement-related information that has been generated on a transaction level available to data warehousing techniques without (solely) relying on the information provided by an EP component. By using the information generated by an accounting component on a transaction level and enriching this information, if required, with further transactional information provided for example by a logistics component or an EP component, data warehousing becomes applicable for spend analysis or other analysis tasks in a procurement context. As becomes apparent from FIG. 10, it is now possible to analyze for example information related to the purchase of individual materials (office materials/direct materials) in a quick and comfortable manner. Such information would be very difficult to obtain if an approach as depicted in FIG. 1 or a similar approach would have been pursued.

Although embodiments of the present invention have been illustrated in the accompanying drawings and described in the aforegoing description, it will be understood that the invention is not limited to the embodiments disclosed. The invention is capable of numerous rearrangements, modifications and substitutions without departing from the spirit of the invention as set forth and defined by the following claims.

What is claimed is:

1. A computer system for making procurement-related information that has been generated on a transaction level available to data warehousing techniques, comprising:
   a processor;
   a memory coupled to the processor;
   a transaction processing layer, configured to utilize the processor, including at least one accounting component with a general ledger data base for centrally storing information contained in accounting-related data sets, the accounting-related data sets being comprised of one or more data lines;
   a data warehousing layer, configured to utilize the processor, for gathering and accumulating information provided by the transaction processing layer;
   a duplicator, configured to utilize the processor, for receiving the accounting-related data sets that will be or have been stored in the general ledger data base, for delivering duplicates of such accounting-related data sets that fulfill a predefined criteria in a procurement context;
   a source data base for storing the duplicated data sets on a data line level; an extractor, configured to utilize the processor, interfacing the data warehousing layer, for selectively moving data contained in data lines or sets of data lines from the source data base to the data warehousing layer; and an analyzer, configured to utilize the processor, for analyzing the duplicated data sets delivered by the duplicator and for adding transfer information to the duplicated data sets, the transfer information controlling at least one of the extraction of data from the source data base and the transfer of extracted data in the data warehousing layer.

2. The computer system of claim 1, further comprising a data sourcing layer, configured to utilize the processor, interfacing the transaction processing layer and the data warehousing layer, the data sourcing layer including at least the source data base and one or more components of the extractor.

3. The computer system of claim 1, wherein the analyzer is configured to add the transfer information in dependence of the relevancy of the duplicated data set for a spend analysis to be performed in the data warehousing layer.

4. The computer system of claim 3, wherein the data warehousing layer includes an information data base for accumulating information contained in the extracted data, the information data base allowing for a multi-dimensional data analysis.

5. The computer system of claim 4, wherein the information data base comprises a fact table and one or more associated dimension tables in a star schema.

6. The computer system of claim 5, wherein the data warehousing layer includes an operational data base that is used for storing on a data line level information contained in the extracted data.

7. The computer system of claim 6, wherein the transfer or extraction of data to the operational data base is controlled by the transfer information that has been added to the duplicated data sets.

8. The computer system of claim 7, wherein the operational data base is used for updating the information data base.

9. The computer system of claim 1, wherein the duplicator includes
a duplicating component for duplicating all accounting-related data sets that will be or have been stored in the general ledger data base; and
a filter that is selectively transmissive for such duplicated data sets that fulfill the predefined criteria.

10. The computer system of claim 9, wherein the filter is arranged in the data sourcing layer.

11. The computer system of claim 1, wherein the duplicator includes
an analyzing component for analyzing all accounting-related data sets that will be or have been stored in the general ledger data base with respect to the predefined criteria; and
a duplicating component selectively duplicating such accounting-related data sets that fulfill the predefined criteria.

12. The computer system of claim 1, further comprising a component for formatting the duplicated data sets on a data line level.

13. The computer system of claim 12, wherein the formatting component is configured to inherit to all data lines of the duplicated data set a procurement-related identifier included in the duplicated data set.

14. The computer system of claim 1, wherein
one or more of the data sets stored in the source data base include several numerical values in a single data line and wherein the extractor is configured to split the data line into individual data lines containing a single numerical value each.

15. The computer system of claim 1, wherein the transaction processing layer further includes at least one of an electronic procurement component and a logistics component, and wherein the extractor merges data provided by one or both components with data extracted from the source data base.

16. A computer system for making procurement-related information that has been generated on a transaction level available to data warehousing techniques, comprising:
a processor;
a memory coupled to the processor;
a transaction processing layer, configured to utilize the processor, including at least one accounting component with a general ledger data base for centrally storing information contained in accounting-related data sets, the accounting-related data sets being comprised of one or more data lines;
a data warehousing layer, configured to utilize the processor, for gathering and accumulating information provided by the transaction processing layer;
a duplicator, configured to utilize the processor, for receiving the accounting-related data sets that will be or have been stored in the general ledger data base, for delivering duplicates of such accounting-related data sets that fulfill a predefined criteria in a procurement context;
a source data base for storing the duplicated data sets on a data line level; an extractor, configured to utilize the processor interfacing the data warehousing layer, for selectively moving data contained in data lines or sets of data lines from the source data base to the data warehousing layer;
a data sourcing layer, configured to utilize the processor interfacing the transaction processing layer and the data warehousing layer, the data sourcing layer including at least the source data base and one or more components of the extractor; and
an analyzer, configured to utilize the processor, for analyzing the duplicated data sets delivered by the duplicator and for adding transfer information to the duplicated data sets, the transfer information controlling at least one of the extraction of data from the source data base and the transfer of extracted data in the data warehousing layer.

17. The computer system of claim 16, wherein the analyzer is configured to add the transfer information in dependence of the relevancy of the duplicated data set for a spend analysis to be performed in the data warehousing layer.

18. The computer system of claim 17, wherein the data warehousing layer includes an information data base for accumulating information contained in the extracted data, the information data base allowing for a multi-dimensional data analysis.

19. The computer system of claim 18, wherein the information data base comprises a fact table and one or more associated dimension tables in a star schema.

20. The computer system of claim 19, wherein the data warehousing layer includes an operational data base that is used for storing on a data line level information contained in the extracted data.

21. The computer system of claim 20, wherein the transfer or extraction of data to the operational data base is controlled by the transfer information that has been added to the duplicated data sets.

22. The computer system of claim 21, wherein the operational data base is used for updating the information data base.

* * * * *